(12) United States Patent
Zhuang et al.

(10) Patent No.: US 8,008,361 B2
(45) Date of Patent: Aug. 30, 2011

(54) METHOD FOR PREPARING A POLY(ARYL ETHER) ANION-EXCHANGE MEMBRANE

(76) Inventors: Lin Zhuang, Wuhan (CN); Jing Pan, Wuhan (CN); Aibin Huang, Wuhan (CN); Shanfu Lu, Wuhan (CN); Juntao Lu, Wuhan (CN)

( * ) Notice: Subject to any disclaimer, the term of this patent is extended or adjusted under 35 U.S.C. 154(b) by 353 days.

(21) Appl. No.: 12/435,425

(22) Filed: May 5, 2009

(65) Prior Publication Data

US 2009/0281201 A1    Nov. 12, 2009

(30) Foreign Application Priority Data

May 6, 2008    (CN) .......................... 2008 1 0047595

(51) Int. Cl.
*C08J 5/20*    (2006.01)

(52) U.S. Cl. ......................................................... 521/27
(58) Field of Classification Search ...................... 521/27
See application file for complete search history.

(56) References Cited

U.S. PATENT DOCUMENTS 5,314,420 A * 5/1994 Smith et al. ................... 604/358
* cited by examiner

*Primary Examiner* — Edward Cain
(74) *Attorney, Agent, or Firm* — Matthias Scholl P.C.; Matthias Scholl

(57) ABSTRACT

A method for preparing a polymer anion-exchange membrane by forming a chloromethylated polymer, quaternizing the chloromethylated polymer, and casting. The method is simple to use and the obtained polymer anion-exchange membrane has good mechanical properties, improved thermal and chemical stability, as well as high ion-exchange capacity.

15 Claims, No Drawings

METHOD FOR PREPARING A POLY(ARYL ETHER) ANION-EXCHANGE MEMBRANE

CROSS-REFERENCE TO RELATED APPLICATIONS

Pursuant to 35 U.S.C. § 119 and the Paris Convention Treaty, this application claims the benefit of Chinese Patent Application No. 200810047595.0 filed May 6, 2008, the contents of which are incorporated herein by reference.

BACKGROUND OF THE INVENTION

1. Field of the Invention

The invention relates to a method for preparing an anion-exchange membrane, and more particularly to a method for preparing a polymer anion-exchange membrane, comprising phenylene and ether linkages.

2. Description of the Related Art

As a crucial element for separation of reactants and anion transport, an anion-exchange membrane is widely used in various industrial fields, incl. water treatment, hydrometallurgy, chemical industry, chemical separation, and electrochemical conversion devices (fuel cells).

Conventional polymer anion-exchange membranes have low thermal and chemical stability, and their quaternary ammonium groups are prone to degradation under high temperature or alkaline conditions, resulting in a decreased ion-exchange capacity (T. Sata, et al., J. Membrane Sci., 1996, 112, 161).

A good polymer anion-exchange membrane should exhibit good thermal and chemical stability and mechanical properties (e.g., tensile strength and flexibility). However, the conventional polymer anion-exchange membranes usually exhibit a significant decrease in mechanical properties upon increasing the ion exchange capacity.

SUMMARY OF THE INVENTION

In view of the above-described problems, it is one objective of the invention to provide a method for preparing a polymer anion-exchange membrane having a good thermal stability, and improved mechanical properties, alkali resistance, and ion-exchange capacity.

To achieve the above objectives, in accordance with one embodiment of the invention, there is provided a method for preparing a polymer anion-exchange membrane comprising: forming chloromethylated polymers, quaternizing the chloromethylated polymers, and casing the quaternary ammonium polymers to form a polymer anion-exchange membrane.

In a class of this embodiment, the preparation of chloromethylated polymers comprises: a) dissolving in a solvent, 1 weight part of polymer whose main chain comprises benzene ($—C_6H_4—$) and ether linkage ($—O—$) as polymer repeat units; b) adding, as catalysts, between 0.05 and 0.5 weight part of zinc powder or aluminum powder and between 0.1 and 1 weight part of fluorine-containing organic acid; c) adding between 1 and 5 weight parts of chloromethyl methyl ether and stirring at between 20° C. and 50° C. for between 2 and 40 hours; and d) precipitating the resultant solution with a lower alcohol, and obtaining a yellow precipitate; and e) washing, grinding, and drying the resultant precipitate to yield a chloromethylated polymer in a powder form.

In a class of this embodiment, the casting of quaternary ammonium polymers comprises: a) dissolving 1 weight part of the obtained chloromethylated polymers in a solvent; b) vaporizing a trimethylamine solution and drying the resultant trimethylamine gas; and c) i) passing the dried trimethylamine gas through the resultant chloromethylated polymer solution for at least 5 minutes; or ii) adding the resultant chloromethylated polymer solution to between 0.3 and 0.5 weight parts of a lower amine in a liquid form, and stirring the resultant mixture at between 40° C. and 70° C. for between 2 and 15 hours to yield a quaternary ammonium polymer solution.

The formation of a polymer anion-exchange membrane comprises casting the resultant quaternary ammonium polymer solution and drying at between 40° C. and 100° C.

In a class of this embodiment, the polymer is a polysulfone (PSF), a polyaryl sulfone (PASF), a phenolphthalein polyether sulfone (PES-C), and a polyaryl ether ether ketone (PEEK).

In a class of this embodiment, the solvent used for chloromethylation is 1,2-dichloroethane, 1,1-dichloroethane, chloroform, methylene chloride, or toluene.

In a class of this embodiment, the concentration of the obtained solution has no effect on the properties of chloromethylated products.

In a class of this embodiment, the fluorine-containing organic acid is trifluoroacetic acid, trifluoromethanesulfonic acid, 3,3,3-trifluoropropionic acid, or 2,3,4,5-tetrafluorobenzoic acid.

In a class of this embodiment, the lower alcohol used as precipitant for chloromethylation is methanol or ethanol.

In a class of this embodiment, the solvent used for quaternization is N,N-dimethylformamide (DMF), N,N-diethylacetamide (DMAc), N-methyl-2-pyrrolidone (NMP), or dimethyl sulfoxide (DMSO).

In a class of this embodiment, the concentration of the obtained solution has no effect on the properties of quaternized products.

In a class of this embodiment, the liquid lower amine is triethylamine, tripropylamine, or tributylamine.

In a class of this embodiment, the membrane formation method comprises casting or tape casting.

Advantages of the invention are summarized below:
1. The chloromethylation grafting is catalyzed by a highly effective catalyst complex, and quaternization is completed in solution, both of which greatly improves reaction efficiency;
2. The ion exchange capacity of polymers can be controlled through the chloromethyl grafting ratio;
3. The mechanical properties, thermal stability, and ion-exchange capacity of the membrane are significantly better than those of conventional polymer anion-exchange membranes; and
4. Methods according to the invention are simple to apply and can be used in combinatorial discovery.

DETAILED DESCRIPTION OF THE EMBODIMENTS

For further illustrating the invention, experiments detailing the preparation of a polymer anion-exchange membrane are described below. It should be noted that the following examples are intended to describe and not to limit the invention.

EXAMPLE 1

1 weight part of polysulfone (PSF) was dissolved in 5 weight parts of 1, 2-dichloroethane. To the solution, 0.05 weight parts of zinc powder, 0.1 weight parts of trifluoroacetic acid, and 0.1 weight parts of chloromethyl methyl ether were added. The resultant mixture was stirred at 30° C. for 6 hours, and then poured into methanol to yield a precipitate. The precipitate was washed with water, dried, ground and dissolved in 20 weight parts of N, N-dimethylformamide (DMF). A trimethylamine solution was vaporized, and the resultant gas was dried and passed through the solution for 5 minutes. The solution was cast and dried at 40° C. to yield an anion-exchange membrane.

In the process of chloromethylation and quaternization, the concentration of the reaction mixture had no effect on the reaction time and the properties of the resultant products.

Following this example, another membrane having similar properties can be obtained with the following substitutions:
(1) polysulfone (PSF) was substituted with polyaryl sulfone (PASF), phenolphthalein polyether sulfone (PES-C) or polyaryl ether ether ketone (PEEK);
(2) as the chloromethylation solvent, 1,2-dichloroethane was substituted with 1,1-dichloroethane, chloroform, methylene chloride, or toluene;
(3) as catalysts, zinc powder was substituted with aluminum powder and trifluoroacetic acid was substituted with trifluoromethanesulfonic acid, 3,3,3-trifluoropropionic acid, or 2,3,4,5-tetrafluorobenzoic acid;
(4) as the chloromethylation precipitant, methanol was substituted with ethanol;
(5) as the quaternization solvent N,N-dimethylformamide (DMF) was substituted with N,N-diethylacetamide (DMAc), N-methyl-2-pyrrolidone (NMP), or dimethyl sulfoxide (DMSO);
(6) trimethylamine gas was passed through the solution for not less than 5 minutes;
(7) tape casting method was substituted with a casting method, and/or
(8) the membrane formation temperature was between 40° C. and 100° C.

EXAMPLE 2

1 weight part of polyaryl sulfone (PASF) was dissolved in 6 weight parts of 1,1-dichloroethane. To the solution, 0.1 weight parts of aluminum powder, 0.4 weight parts of trifluoromethanesulfonic acid, and 3 weight parts of chloromethyl methyl ether were added. The resultant mixture was stirred at 30° C. for 6 hours, and then poured into ethanol to yield a precipitate. The precipitate was washed with water, dried, ground, and dissolved in 30 weight parts of N,N-diethylacetamide (DMAc). A trimethylamine solution was vaporized, and the resultant gas was dried and passed through the solution for 10 minutes. The solution was tape cast, and dried at 60° C. to yield an anion-exchange membrane.

In the process of chloromethylation and quaternization, the solution concentration had no effect on the reaction time and the properties of the resultant products.

Following this example, another membrane having similar properties can be obtained with the following substitutions:
(1) polyaryl sulfone (PASF) was substituted with polysulfone (PSF), phenolphthalein polyether sulfone (PES-C), or polyaryl ether ether ketone (PEEK);
(2) as the chloromethylation solvent, 1,1-dichloroethane was substituted with 1,2-dichloroethane, chloroform, methylene chloride, or toluene;
(3) as catalysts, aluminum powder was substituted with zinc powder and trifluoromethanesulfonic acid was substituted with trifluoroacetic acid, 3,3,3-trifluoropropionic acid, or 2,3,4,5-tetrafluorobenzoic acid;
(4) as the chloromethylation precipitant, ethanol was substituted with methanol;
(5) as the quaternization solvent, N,N-diethylacetamide (DMAc) was substituted with N,N-dimethylformamide (DMF), N-methyl-2-pyrrolidone (NMP), or dimethyl sulfoxide (DMSO);
(6) trimethylamine gas was passed through the solution for not less than 5 minutes;
(7) tape casting method was substituted with a casting method, and
(8) the membrane formation temperature was between 40° C. and 100° C.

EXAMPLE 3

1 weight part of phenolphthalein polyether sulfone (PES-C) was dissolved in 7 weight parts of chloroform. To the solution, 0.5 weight parts of zinc powder, 1 weight part of 3,3,3-trifluoropropionic acid, and 5 weight parts of chloromethyl methyl ether were added. The resultant mixture was stirred at 30° C. for 6 hours, and then poured into methanol to yield a precipitate. The precipitate was washed with water, dried, ground, and dissolved in 10 weight parts of N-methyl-2-pyrrolidone (NMP). A trimethylamine solution was vaporized, and the resultant gas was dried and passed through the solution for 15 minutes. The solution was cast and dried at 80° C. to yield an anion-exchange membrane.

In the process of chloromethylation and quaternization, the solution concentration had no effect on the reaction time and the properties of the resultant product.

Following this example, another membrane having similar properties can be obtained with the following substitutions:
(1) phenolphthalein polyether sulfone (PES-C) was substituted with polysulfone (PSF), polyaryl sulfone (PASF), or polyaryl ether ether ketone (PEEK);
(2) as the chloromethylation solvent, chloroform was substituted with 1,2-dichloroethane, 1,1-dichloroethane, methylene chloride, or toluene;
(3) as catalysts, zinc powder was substituted with aluminum powder, and 3,3,3-trifluoropropionic acid was substituted with trifluoroacetic acid, trifluoromethanesulfonic acid, or 2,3,4,5-tetrafluorobenzoic acid;
(4) as the chloromethylation precipitant, methanol was substituted with ethanol;
(5) as the quaternization solvent, N-methyl-2-pyrrolidone (NMP) was substituted with N,N-dimethylformamide (DMF), N,N-diethylacetamide (DMAc), or dimethyl sulfoxide (DMSO);
(6) trimethylamine gas was passed through the solution for not less than 5 minutes;
(7) casting method was substituted with a tape casting method, and/or
(8) the membrane formation temperature was between 40° C. and 100° C.

EXAMPLE 4

1 weight part of polysulfone (PSF) was dissolved in 8 weight parts of 1,2-dichloroethane. To the solution, 0.1 weight parts of zinc powder, 0.4 weight parts of trifluoroacetic acid, and 3 weight parts of chloromethyl methyl ether were added. The resultant mixture was divided into 4 parts and each part stirred at 20° C., 30° C., 40° C., and 50° C., respectively, for 6 hours, and then poured into methanol to yield a precipitate. The precipitate was washed with water, dried, ground, and dissolved in 5 weight parts of N,N-dimethylformamide (DMF). A trimethylamine solution was vaporized, and the resultant gas was dried and passed through the solution for 30 minutes. The solution was cast and dried at 60° C. to yield an anion-exchange membrane.

In this example, it was observed that the higher the reaction temperature of chloromethylation, the higher the chloromethylation grafting ratio of products in the same reaction time, and the higher the ion-exchange capacity of polymer anion-exchange membrane.

In the process of chloromethylation and quaternization, the solution concentration had no effect on the reaction time and the properties of the resultant products.

Following this example, another membrane having similar properties can be obtained with the following substitutions:
(1) polysulfone (PSF) was substituted with polyaryl sulfone (PASF), phenolphthalein polyether sulfone (PES-C), or polyaryl ether ether ketone (PEEK);
(2) as the chloromethylation solvent, 1,2-dichloroethane was substituted with 1,1-dichloroethane, chloroform, methylene chloride, or toluene;
(3) as catalysts, zinc powder was substituted with aluminum powder and trifluoroacetic acid was substituted with trifluoromethanesulfonic acid, 3,3,3-trifluoropropionic acid, or 2,3,4,5-tetrafluorobenzoic acid;
(4) as the chloromethylation precipitant, methanol was substituted with ethanol;
(5) as the quaternization solvent N,N-dimethylformamide (DMF) was substituted with N,N-diethylacetamide (DMAc), N-methyl-2-pyrrolidone (NMP), or dimethyl sulfoxide (DMSO);
(6) trimethylamine gas was passed through the solution for not less than 5 minutes;
(7) casting method was substituted with a tape casting method, and/or
(8) the membrane formation temperature was between 40° C. and 100° C.

EXAMPLE 5

1 weight part of polysulfone (PSF) was dissolved in 9 weight parts of 1,2-dichloroethane. To the solution, 0.1 weight parts of zinc powder, 0.4 weight parts of trifluoroacetic acid, and 3 weight parts of chloromethyl methyl ether were added. The resultant mixture was divided into 7 parts and each part stirred at 30° C. for 2 hours, 4 hours, 6 hours, 8 hours, 12 hours, 16 hours, and 20 hours, respectively, and then poured separately into methanol to yield a precipitate. The precipitates were washed with water, dried, ground, and dissolved in 3 weight part of N,N-dimethylformamide (DMF). Trimethylamine aqueous solution was vaporized, and the resultant gas was dried and passed through the solution for 5 minutes. The solution was tape cast and dried at 60° C. to yield an anion-exchange membrane.

In this example, it was observed that at the same reaction temperature, the longer the chloromethylation reaction time, the higher the chloromethylation grafting ratio of products, and the higher the ion-exchange capacity of polymer anion-exchange membrane.

In the process of chloromethylation and quaternization, the solution concentration had no effect on the reaction and the properties of the resultant products.

Following this example, another membrane having similar properties can be obtained with the following substitutions:
(1) polysulfone (PSF) was substituted with polyaryl sulfone (PASF), phenolphthalein polyether sulfone (PES-C), or polyaryl ether ether ketone (PEEK);
(2) as the chloromethylation solvent, 1,2-dichloroethane was substituted with 1,1-dichloroethane, chloroform, methylene chloride, or toluene;
(3) as catalysts, zinc powder was substituted with aluminum powder, and trifluoroacetic acid was substituted with trifluoromethanesulfonic acid, 3,3,3-trifluoropropionic acid, or 2,3,4,5-tetrafluorobenzoic acid;
(4) as the chloromethylation precipitant, methanol was substituted with ethanol;
(5) as the quaternization solvent, N,N-dimethylformamide (DMF) was substituted with N,N-diethylacetamide (DMAc), N-methyl-2-pyrrolidone (NMP), or dimethyl sulfoxide (DMSO);
(6) trimethylamine gas was passed through the solution for not less than 5 minutes;
(7) casting method was substituted with a tape casting method, and/or
(8) the membrane formation temperature was between 40° C. and 100° C.

EXAMPLE 6

1 weight part of polyaryl ether ether ketone (PEEK) was dissolved in 10 weight parts of methylene chloride. To the solution, 0.1 weight parts of aluminium powder, 0.4 weight parts of 2,3,4,-tetrafluorobenzoic acid, and 3 weight parts of chloromethyl methyl ether were added. The resultant mixture was stirred at 30° C. for 6 hours, and then poured into ethanol to yield a precipitate. The precipitate was washed with water, dried, ground, and dissolved in 10 weight parts of dimethyl sulfoxide (DMSO). To the solution, 0.3 weight parts of triethylamine were added, and it was stirred at 40° C. for 2 hours. The solution was cast and dried at 100° C. to yield an anion-exchange membrane.

In the process of chloromethylation and quaternization, the solution concentration had no effect on the reaction time and the properties of the resultant products.

Following this example, another membrane having similar properties can be obtained with the following substitutions:
(1) polyaryl ether ether ketone (PEEK) was substituted with polysulfone (PSF), polyaryl sulfone (PASF), or phenolphthalein polyether sulfone (PES-C);
(2) as the chloromethylation solvent, methylene chloride was substituted with 1,2-dichloroethane, 1,1-dichloroethane, chloroform, or toluene;
(3) as catalysts, aluminum powder was substituted with zinc powder and 2,3,4,5-tetrafluorobenzoic acid was substituted with trifluoroacetic acid, trifluoromethanesulfonic acid, or 3,3,3-trifluoropropionic acid;
(4) as the chloromethylation precipitant, ethanol was substituted with methanol;
(5) as the quaternization solvent, dimethyl sulfoxide (DMSO) was substituted with N,N-dimethylformamide (DMF), N,N-diethylacetamide (DMAc), or N-methyl-2-pyrrolidone (NMP);
(6) as the aminating agent, triethylamine was substituted with tripropylamine, or tributylamine;
(7) casting method was substituted with a tape casting method, and/or
(8) the membrane formation temperature was between 40° C. and 100° C.

EXAMPLE 7

1 weight part of polyaryl sulfone (PASF) was dissolved in 11 weight parts of 1,2-dichloroethane. To the solution, 0.05 weight parts of zinc powder, 0.1 weight parts of trifluoromethanesulfonic acid, and 1 weight part of chloromethyl methyl ether were added. The resultant mixture was stirred at 30° C. for 6 hours, and then poured into ethanol to yield a precipitate. The precipitate was washed with water, dried, ground, and dissolved in 30 weight parts of N,N-diethylacetamide (DMAc). To the solution, 0.3 weight parts of tripropylamine was added, and stirred at 50° C. for 8 hours. The solution was cast by a tape casting method and dried at 80° C. to yield an anion-exchange membrane.

In the process of chloromethylation and quaternization, the solution concentration had no effect on the reaction time and the properties of the resultant products.

Following this example, another membrane having similar properties can be obtained with the following substitutions:
(1) polyaryl sulfone (PASF) was substituted with polysulfone (PSF), polyaryl ether ether ketone (PEEK), or phenolphthalein polyether sulfone (PES-C);
(2) as the chloromethylation solvent, 1,2-dichloroethane was substituted with methylene chloride, 1,1-dichloroethane, chloroform, or toluene;
(3) as catalysts, zinc powder was substituted with aluminum powder and trifluoromethanesulfonic acid was substituted with trifluoroacetic acid, 2,3,4,5-tetrafluorobenzoic acid, or 3,3,3-trifluoropropionic acid;
(4) as the chloromethylation precipitant, ethanol was substituted with methanol;
(5) as the quaternization solvent, N,N-diethylacetamide (DMAc) was substituted with N,N-dimethylformamide (DMF), dimethyl sulfoxide (DMSO), or N-methyl-2-pyrrolidone (NMP);
(6) as the aminating agent, tripropylamine was substituted with triethylamine, or tributylamine;
(7) tape casting method was substituted with a casting method, and/or
(8) the membrane formation temperature was between 40° C. and 100° C.

EXAMPLE 8

1 weight part of phenolphthalein polyether sulfone (PES-C) was dissolved in 12 weight parts of chloroform. To the solution, 0.5 weight part of aluminum powder, 1 weight part of 3,3,3-trifluoropropionic acid, and 5 weight parts of chloromethyl methyl ether were added. The resultant mixture was stirred at 30° C. for 6 hours, and then poured into ethanol to yield a precipitate. The precipitate was washed with water, dried, ground, and dissolved in 20 weight parts of dimethyl sulfoxide (DMSO). To the solution, 0.5 weight part of tributylamine was added, and it was stirred at 50° C. for 8 hours. The solution was cast and dried at 60° C. to yield an anion-exchange membrane.

In the process of chloromethylation and quaternization, the solution concentration had no effect on the reaction time and the properties of the resultant products.

Following this example, another membrane having similar properties can be obtained with the following substitutions:
(1) phenolphthalein polyether sulfone (PES-C) was substituted with polysulfone (PSF), polyaryl ether ether ketone (PEEK), or polyaryl sulfone (PASF);
(2) as the chloromethylation solvent, chloroform was substituted with methylene chloride, 1,1-dichloroethane, 1,2-dichloroethane, or toluene;
(3) as catalysts, aluminum powder was substituted with zinc powder and 3,3,3-trifluoropropionic acid was substituted with trifluoroacetic acid, 2,3,4,5-tetrafluorobenzoic acid, or trifluoromethanesulfonic acid;
(4) as the chloromethylation precipitant, ethanol was substituted with methanol;
(5) as the quaternization solvent, dimethyl sulfoxide (DMSO) was substituted with N,N-dimethylformamide (DMF), N,N-diethylacetamide (DMAc), or N-methyl-2-pyrrolidone (NMP);
(6) as the aminating agent, tributylamine was substituted with triethylamine, or tripropylamine;
(7) casting method was substituted with a tape casting method, and/or
(8) the membrane formation temperature was between 40° C. and 100° C.

EXAMPLE 9

1 weight part of polyaryl ether ether ketone (PEEK) was dissolved in 7 weight parts of toluene. To the solution, 0.1 weight parts of zinc powder, 0.4 weight parts of trifluoroacetic acid, and 1 weight part of chloromethyl methyl ether were added. The resultant mixture was stirred at 30° C. for 6 hours, and then poured into methanol to yield a precipitate. The precipitate was washed with water, dried, ground, and dissolved in 10 weight parts of N,N-dimethylformamide (DMF). To the solution, 0.3 weight parts of triethylamine were added, and it was stirred at 70° C. for 15 hours. The solution was tape cast and dried at 60° C. to yield an anion-exchange membrane.

In the process of chloromethylation and quaternization, the solution concentration had no effect on the reaction time and the properties of the resultant products.

Following this example, another membrane having similar properties can be obtained with the following substitutions:
(1) polyaryl ether ether ketone (PEEK) was substituted with polysulfone (PSF), phenolphthalein polyether sulfone (PES-C), or polyaryl sulfone (PASF);
(2) as the chloromethylation solvent, toluene was substituted with methylene chloride, 1,1-dichloroethane, 1,2-dichloroethane, or chloroform;
(3) as catalysts, zinc powder was substituted with aluminum powder and trifluoroacetic acid was substituted with 3,3,3-trifluoropropionic acid, 2,3,4,5-tetrafluorobenzoic acid, or trifluoromethanesulfonic acid;
(4) as the chloromethylation precipitant, methanol was substituted with ethanol;
(5) as the quaternization solvent, N,N-dimethylformamide (DMF) was substituted with dimethyl sulfoxide (DMSO), N,N-diethylacetamide (DMAc), or N-methyl-2-pyrrolidone (NMP);
(6) as the aminating agent, triethylamine was substituted with tributylamine, or tripropylamine;
(7) tape casting method was substituted with a casting method, and/or
(8) the membrane formation temperature was between 40° C. and 100° C.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:
1. A method for preparing a polymer anion-exchange membrane, comprising the steps of:
(a) dissolving in a first solvent, 1 weight part of a polymer comprising in its main chain benzene and ether repeat units; adding between 0.05 and 0.5 weight parts of zinc powder or aluminum powder and between 0.1 and 1 weight parts of a fluorine-containing organic acid; adding between 1 and 5 weight parts of chloromethyl methyl ether; and stirring at between 20° C. and 50° C. for between 2 and 20 hours to yield a first reaction mixture comprising a chloromethylated polymer; pouring said first reaction mixture into a lower alcohol to precipitate said chloromethylated polymer; and optionally, washing, grinding, and drying said chloromethylated polymer;

(b) dissolving in a second solvent said chloromethylated polymer obtained in step (a) to yield a solution of said chloromethylated polymer; vaporizing a trimethylamine solution to obtain trimethylamine vapor, drying said trimethylamine vapor to obtain dried trimethylamine vapor; and passing said dried trimethylamine vapor through said solution of said chloromethylated polymer for not less than 5 minutes to yield a quaternary ammonium polymer solution; and (c) casting said quaternary ammonium polymer solution and drying at between 40° C. and 100° C.

2. The method of claim 1, wherein said polymer comprising in its main chain benzene and ether repeat units is a polysulfone, a polyaryl sulfone, a phenolphthalein polyether sulfone, or a polyaryl ether ether ketone.

3. The method of claim 1, wherein said first solvent is 1,2-dichloroethane, 1,1-dichloroethane, chloroform, methylene chloride, or toluene.

4. The method of claim 1, wherein said fluorine-based organic acid is trifluoroacetic acid, trifluoromethanesulfonic acid, 3,3,3-trifluoropropionic acid, or 2,3,4,5-tetrafluorobenzoic acid.

5. The method of claim 1, wherein said lower alcohol is methanol or ethanol.

6. The method of claim 1, wherein said second solvent is N,N-dimethylformamide, N,N-diethylacetamide, N-methyl-2-pyrrolidone, or dimethyl sulfoxide.

7. The method of claim 1, wherein said casting in step (c) is casting or tape casting.

8. A method for preparing a polymer anion-exchange membrane, comprising the steps of:

(a) dissolving in a first solvent: 1 weight part of a polymer comprising in its main chain benzene and ether repeat units; adding between 0.05 and 0.5 weight parts of zinc powder or aluminum powder and between 0.1 and 1 weight parts of a fluorine-containing organic acid; adding between 1 and 5 weight parts of chloromethyl methyl ether; and stirring at between 20° C. and 50° C. for between 2 and 40 hours to yield a first reaction mixture comprising a chloromethylated polymer; pouring said first reaction mixture into a lower alcohol to precipitate said chloromethylated polymer; and optionally, washing, grinding and drying said chloromethylated polymer;

(b) dissolving in a second solvent: 1 weight part of said chloromethylated polymer obtained in step (a) to yield a solution of said chloromethylated polymer; adding between 0.3 and 0.5 weight parts of a lower amine, said lower amine being in a liquid form; and stirring at between 40° C. and 70° C. for between 2 and 15 hours; and to yield a quaternary ammonium polymer solution; and (c) casting said quaternary ammonium polymer solution and drying at between 40° C. and 100° C.

9. The method of claim 8, wherein said polymer comprising in its main chain benzene and ether repeat units is a polysulfone, a polyaryl sulfone, a phenolphthalein polyether sulfone, or a polyaryl ether ether ketone.

10. The method of claim 8, wherein said first solvent is 1,2-dichloroethane, 1,1-dichloroethane, chloroform, methylene chloride, or toluene.

11. The method of claim 8, wherein said fluorine-based organic acid is trifluoroacetic acid, trifluoromethanesulfonic acid, 3,3,3-trifluoropropionic acid, or 2,3,4,5-tetrafluorobenzoic acid.

12. The method of claim 8, wherein said lower alcohol is methanol or ethanol.

13. The method of claim 8, wherein said second solvent is N,N-dimethylformamide, N,N-diethylacetamide, N-methyl-2-pyrrolidone, or dimethyl sulfoxide.

14. The method of claim 8, wherein said lower amine is triethylamine, tripropylamine, or a butylamine.

15. The method of claim 8, wherein said casting in step (c) is casting or tape casting.

* * * * *